US012132383B2

(12) United States Patent
Cohen (10) Patent No.: US 12,132,383 B2
(45) Date of Patent: Oct. 29, 2024

(54) CURRENT SAMPLING IN CONVERTER CIRCUITS

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 380 days.

(21) Appl. No.: 17/730,200

(22) Filed: Apr. 27, 2022

(65) Prior Publication Data

US 2023/0353030 A1 Nov. 2, 2023

(51) Int. Cl.
*H02M 1/00* (2007.01)
*H02M 3/155* (2006.01)

(52) U.S. Cl.
CPC ......... *H02M 1/0009* (2021.05); *H02M 3/155* (2013.01)

(58) Field of Classification Search
CPC ..... H02M 1/0009; H02M 3/155; H02M 3/156
See application file for complete search history.

(56) References Cited

U.S. PATENT DOCUMENTS

| 9,634,617 B2* | 4/2017 | Ivanov | H03F 1/086 |
| 2009/0315401 A1* | 12/2009 | Yoshida | H02J 9/061 |
| | | | 307/44 |
| 2021/0013832 A1* | 1/2021 | Limbasiya | H02S 50/15 |

* cited by examiner

*Primary Examiner* — Jue Zhang
*Assistant Examiner* — Afework S Demisse
(74) *Attorney, Agent, or Firm* — Charles F. Koch; Frank D. Cimino (57) ABSTRACT

In described examples, a circuit includes a voltage sensor that has an output, first and second transconductance amplifiers, first and second switches, a capacitive element, a comparator, and a sampling circuit. Each of the first and second transconductance amplifiers has a respective input, a respective output, and a respective transconductance. The first switch is coupled between the voltage sensor output and the first transconductance amplifier input. The second switch is coupled between the voltage sensor output and the second transconductance amplifier input. The capacitive element has a first terminal coupled to the respective outputs of the first and second transconductance amplifiers. The comparator has a respective input and a respective output. The comparator input is coupled to the respective outputs of the first and second transconductance amplifiers and to the first terminal of the capacitive element. The sampling circuit is coupled to the output of the comparator.

21 Claims, 8 Drawing Sheets

CURRENT SAMPLING IN CONVERTER CIRCUITS

TECHNICAL FIELD

This application relates generally to converter circuits, also referred to herein as power converters, and more particularly to an output-regulated power converter that provides efficient conversion of input voltage to output voltage.

BACKGROUND

Boost, buck, and buck-boost are different types of power converter topologies, in particular DC-to-DC power converters. Each of these types of power converter may include an inductor, a switch, and a rectifier and can be used to power various types of end equipment, such as in power electronics, automotive, and industrial applications. Also, for all three topologies, average currents in the inductor, the switch during its conduction, and the rectifier during its conduction are equal. Average current value can be detected or measured by sampling the value of the current in the switch, the rectifier, or the inductor at the center of a conduction interval of the switch or the rectifier. The sampled current can be used to control or regulate the input or output current of the power converter.

SUMMARY

In described examples, a circuit includes a voltage sensor that has an output, first and second transconductance amplifiers, first and second switches, a capacitive element, a comparator, and a sampling circuit. Each of the first and second transconductance amplifiers has a respective input, a respective output, and a respective transconductance. The first switch is coupled between the voltage sensor output and the first transconductance amplifier input. The second switch is coupled between the voltage sensor output and the second transconductance amplifier input. The capacitive element has a first terminal coupled to the respective outputs of the first and second transconductance amplifiers. The comparator has a respective input and a respective output. The comparator input is coupled to the respective outputs of the first and second transconductance amplifiers and to the first terminal of the capacitive element. The sampling circuit is coupled to the output of the comparator.

DETAILED DESCRIPTION

Figure 1A:
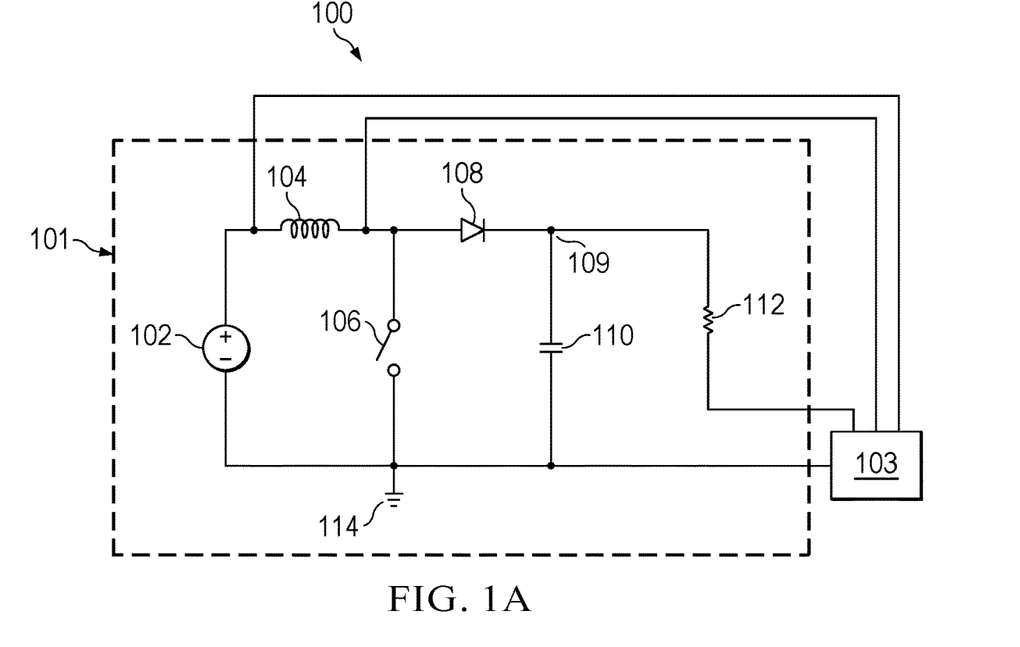
FIG. 1A shows a circuit diagram of an example system that includes a boost converter, an average current measurement circuit, and a load.
Figure 1B:
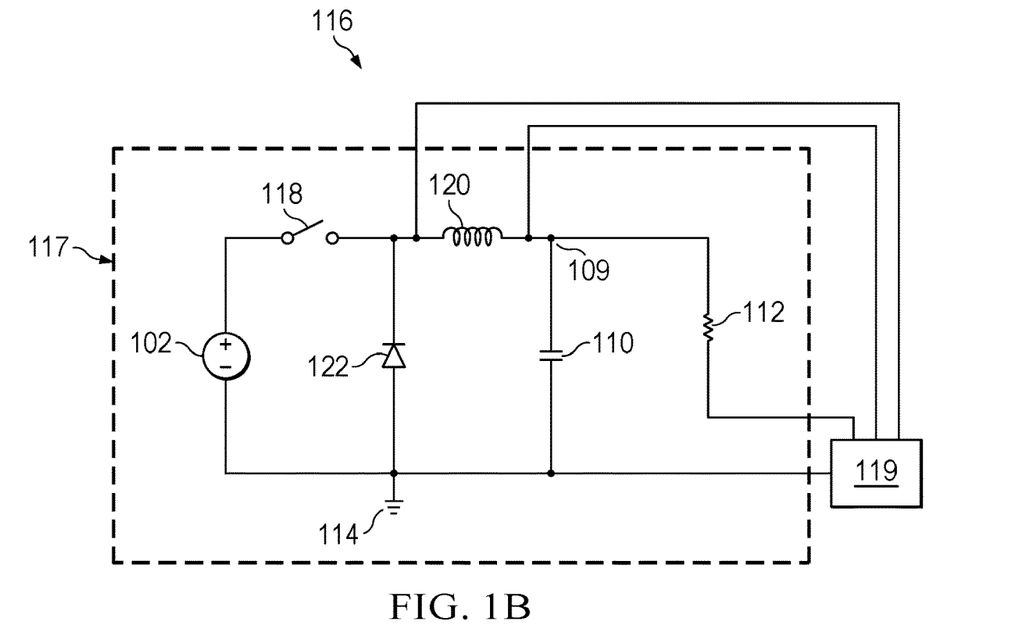
FIG. 1B shows a circuit diagram of an example system that includes a buck converter, an average current measurement circuit, and a load.
Figure 1C:
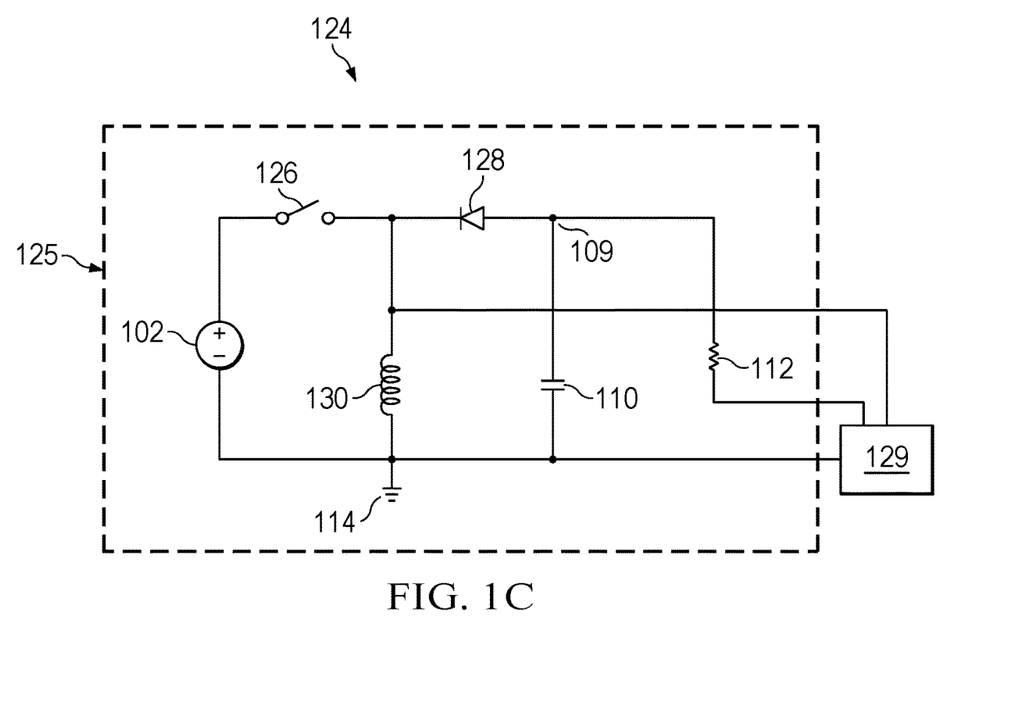
FIG. 1C shows a circuit diagram of an example system that includes a buck-boost converter, an average current measurement circuit, and a load.

FIGS. 1A, 1B, and 1C illustrate respective example systems that include a converter circuit and an average current measurement circuit that may be used to sample the current in the converter circuit, in which the current is or substantially is equivalent to an average current value of the converter circuit. For example, the average current value is an average current value of the inductor, the rectifier, or the switch. More particularly, FIG. 1A shows a circuit diagram of an example system 100 that includes a boost converter 101, an average current measurement circuit 103, and a load 112 (represented as a resistor 112). The load 112 may represent various devices, including power supplies for various applications. An electrical ground 114 is also shown. The boost converter 101 steps up (increases) voltage, while stepping down (decreasing) current, from its input (voltage source 102) to its output 109, in which a voltage at its output 109 is provided to the load 112.

In this example, the boost converter 101 includes a voltage source 102, an inductor 104, a switch 106, a diode 108, and a capacitor 110. A boost converter may include additional elements, not illustrated. In some examples, the switch 106 represents a semiconductor device such as a field-effect transistor (FET). In some examples, the diode 108 is a semiconductor diode or a diode-connected transistor. As shown, a positive terminal of the voltage source 102 is connected to a first input of the average current measurement circuit 103 and to a first terminal of the inductor 104. A second terminal of the inductor 104 is connected to a second input of the average current measurement circuit 103, a first terminal of the switch 106 and an anode of the diode 108. A cathode of the diode 108 is connected to a first conductor of the capacitor 110 (e.g., via a first capacitor terminal) and to a first terminal of the load 112. A second terminal of the load 112 is connected to a third input of the average current measurement circuit 103. A negative terminal of the voltage source 102, a second terminal of the switch 106, a second conductor of the capacitor 110 (e.g., via a second capacitor terminal), and a ground terminal of the average current measurement circuit 103 are connected to ground 114.

The operation of the boost converter 101 is generally controlled by the closed or open state of the switch 106, corresponding to one of two respective phases. In a first phase also referred to herein as an energy storing phase, after the switch 106 is closed, current across the inductor 104 is increased. Moreover, during this phase: the inductor 104 stores energy by generating a magnetic field while current flows from the voltage source 102 through the inductor 104 and the switch 106; and the capacitor 110 discharges across the load 112. The diode 108 prevents the capacitor 110 from discharging across the switch 106. In a second phase also referred to herein as a discharge phase, after the switch 106 is opened, energy stored in the inductor 104 is discharged as current through the diode 108 and the load 112, and charges the capacitor 110.

FIG. 1B shows a circuit diagram of an example system 116 that includes a buck converter 117, an average current measurement circuit 119, and a load 112. (Similar components in similar configuration in different figures will be numbered the same.) The buck converter 117 steps down voltage, while stepping up current, from the input (voltage source 102) of the buck converter 117 input (voltage source 102) to its output 109.

In the buck converter 117, the positive terminal of the voltage source 102 is connected to a first terminal of a switch 118. A second terminal of the switch 118 is connected to a first input of the average current measurement circuit 119, a first terminal of an inductor 120, and a cathode of a diode 122. A second terminal of the inductor 120 is connected to a second input of the average current measurement circuit 119, the first conductor of the capacitor 110 (e.g., via a first capacitor terminal) and the first terminal of the load 112. The second terminal of the load 112 is connected to a third input of the average current measurement circuit 119. The ground 114 is connected to the negative terminal of the voltage source 102, an anode of the diode 122, the second conductor of the capacitor 110 (e.g., via a second capacitor terminal), and a ground terminal of the average current measurement circuit 119.

The operation of the buck converter 116 is generally controlled by the closed or open state of the switch 106, corresponding to one of two respective phases. In a first phase, after the switch 118 is closed, current across the inductor 120 is increased, and the inductor 120 stores energy by generating a magnetic field while current flows from the voltage source 102, through the switch, the inductor 120, and the load 112. In a second phase, after the switch 118 is opened, the inductor 120 becomes a current source; the energy stored in the magnetic field of the inductor 120 supports current flow through the diode 122, the inductor 120, and the load 112.

FIG. 1C shows a circuit diagram of an example system 124 that includes a buck-boost converter 125, an average current measurement circuit 129, and a load 112. The buck-boost converter 125 can step up voltage and step down current, or step down voltage and step up current, depending on a duty cycle of a switch 126.

In the buck-boost converter 124, the positive terminal of the voltage source 102 is connected to a first terminal of a switch 126. A second terminal of the switch 126 is connected to a cathode of a diode 128, a first input of the average current measurement circuit 129, and a first terminal of an inductor 130. An anode of the diode 128 is connected to a first conductor of the capacitor 110 (e.g., via a first capacitor terminal) and a first terminal of the load 112. The second terminal of the load 112 is connected to a second input of the average current measurement circuit 129. The ground 114 is connected to the negative terminal of the voltage source 102, a second terminal of the inductor 130, the second conductor of the capacitor 110 (e.g., via a second capacitor terminal), and a ground terminal of the average current measurement circuit 129. The ground terminal of the average current measurement circuit 129 can also be viewed as a third input of the average current measurement circuit 129.

The operation of the buck-boost converter 124 is generally controlled by the closed or open state of the switch 106, corresponding to one of two respective phases. In a first phase, after the switch 126 is closed, current across the inductor 130 is increased, and the inductor 130 stores energy by generating a magnetic field, while current flows from the current source 102, through the switch 126 and the inductor 130. In a second phase, after the switch 126 is opened, the inductor 130 becomes a current source; the energy stored in the magnetic field of the inductor 130 supports current flow from the inductor 130 into the load 112 and capacitor 110 through the diode 128.

Figure 2A:
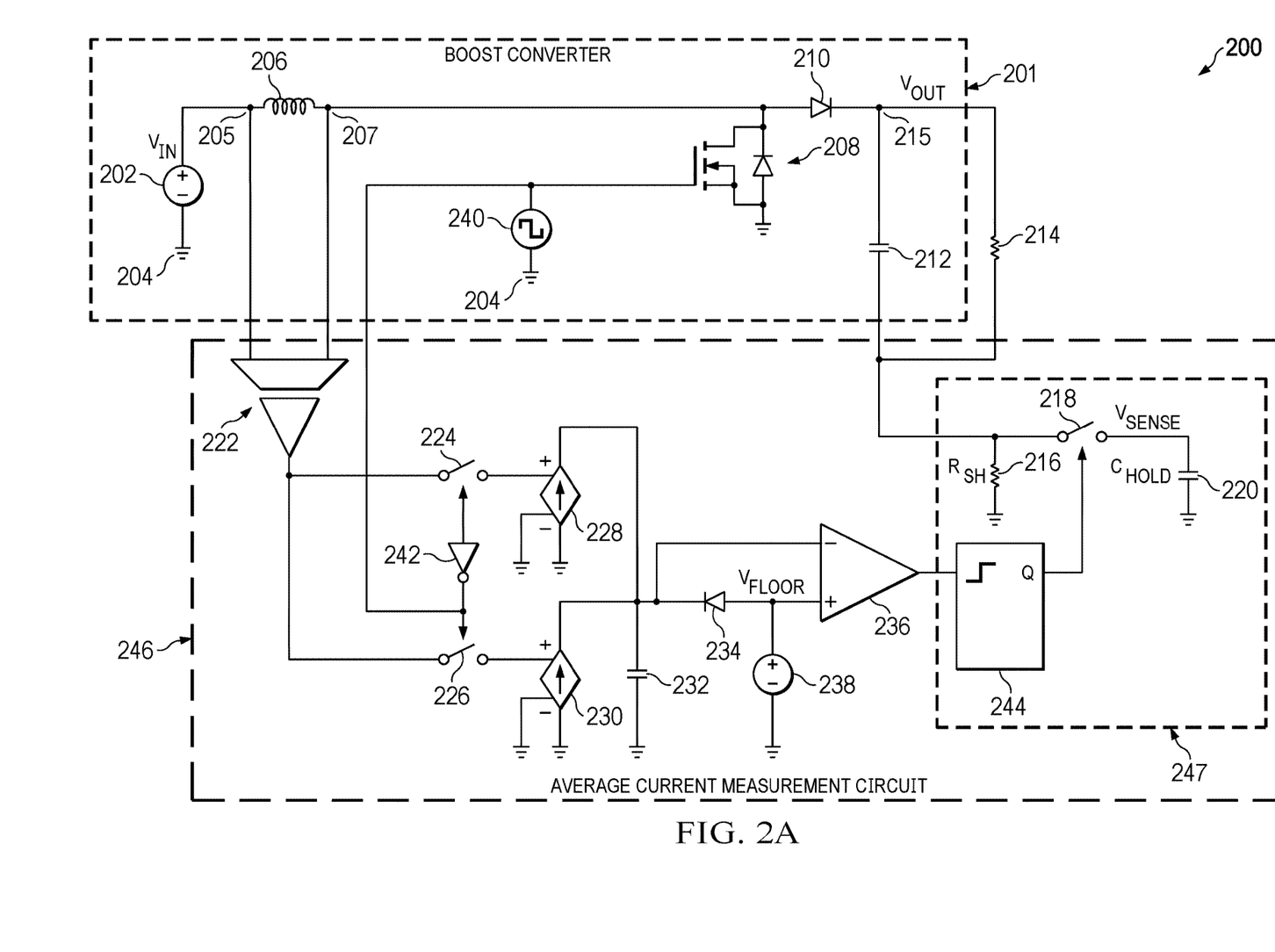
FIG. 2A shows a circuit diagram of an example system with an average current measurement circuit.

FIG. 2A shows a circuit diagram of an example system 200 with an average current measurement circuit 246. The system 200 includes a boost converter 201, an average current measurement circuit 246, and a load 214. The system 200 also includes an electrical ground 204. The boost converter 201 includes a voltage source 202, an inductor 206, an n-channel enhancement mode metal-oxide-semiconductor field-effect transistor (NMOS FET) 208 (referred to herein as a converter switch 208), a converter diode 210, and a load capacitor 212. The voltage source 202, inductor 206, converter switch 208, converter diode 210, load capacitor 212, and load 214 of FIG. 2A respectively correspond to the voltage source 102, inductor 104, switch 106, diode 108, capacitor 110, and load 112 of FIG. 1A. The average current measurement circuit 246 includes a voltage sensor 222, charging and discharging switches 224 and 226, an inverter 242, charging and discharging transconductance amplifiers 228 and 230, a sense capacitor 232, a sense diode 234, a sense voltage source 238, a comparator 236 (in some examples, an error amplifier), a monostable multivibrator 244, a shunt resistor 216, a sense switch 218, and a hold capacitor 220. In some examples, the boost converter 201 and the average current measurement circuit 246 are included on a same piece of silicon (die). In another example, the boost converter 201 and the average current measurement circuit 246 are included on separate dies. In another example, the boost converter 201 is included on multiple dies, or elements thereof are not on the same die. In another example, the average current measurement circuit 246 is included on multiple dies, or elements thereof are not on the same die.

A negative terminal of the converter voltage source 202 is connected to ground 204. A positive terminal of the converter voltage source 202 is connected to a first terminal 205 of the inductor 206. The converter voltage source 202 provides a voltage VIN across the inductor 206. A second terminal 207 of the inductor 206 is connected to a first terminal (drain) of the converter switch 208 and an anode of the converter diode 210 (a rectifier diode). A cathode of the converter diode 210 is connected to a first conductor of the load capacitor 212 (e.g., via a first capacitor terminal) and to a first terminal of the load 214. An output terminal 215 of the system 200 is connected to the cathode of the converter diode 210, the first conductor of the load capacitor 212 (e.g., via a first capacitor terminal), and the first terminal of the load 214. A second conductor of the load capacitor 212 is connected (e.g., via a second capacitor terminal) to a second terminal of the load 214, a first terminal of the shunt resistor 216, and a first terminal of the sense switch 218. The shunt resistor has a resistance $R_{SH}$. A second terminal of the shunt resistor 216 is connected to ground 204. A second terminal of the sense switch 218 is connected to a first conductor of the hold capacitor 220 (e.g., via a first capacitor terminal). The hold capacitor 220 has a capacitance $C_{HOLD}$. A second conductor of the hold capacitor 220 is connected to ground 204 (e.g., via a second capacitor terminal). A voltage between the first conductor of the hold capacitor 220 and ground 204 is $V_{SENSE}$.

A first (positive) input of the voltage sensor 222 is connected to the first terminal 205 of the inductor 206, and a second (negative) input of the voltage sensor 222 is connected to the second terminal 207 of the inductor 206. An output of the voltage sensor 222 is connected to a first terminal of the charging switch 224 and to a first terminal of the discharging switch 226. A second terminal of the charging switch 224 is connected to a positive voltage input of the charging transconductance amplifier 228. The charging transconductance amplifier 228 has transconductance $g_m$. A negative voltage input of the charging transconductance amplifier 228 are each connected to ground 204. Another input of the charging transconductance amplifier 228 is connected between ground 204 and a current output path of the charging transconductance amplifier 228.

A second terminal of the discharging switch 226 is connected to a positive voltage input of the discharging transconductance amplifier 230. The discharging transconductance amplifier 230 has transconductance $2 \times g_m$. A negative voltage input of the discharging transconductance amplifier 230 is connected to ground 204. Another input of the discharging transconductance amplifier 230 is connected between ground 204 and a current output path of the discharging transconductance amplifier 230. A current output of the charging transconductance amplifier 228 is connected to a current output of the discharging transconductance amplifier 230, a first conductor of the sense capacitor 232 (e.g., via a first capacitor terminal), a cathode of the sense diode 234, and an inverting input of the comparator 236. A second conductor of the sense capacitor 232 is connected (e.g., via a second capacitor terminal) to ground 204. The sense capacitor 232 has capacitance $C_{SENSE}$. An anode of the sense diode 234 is connected to a positive terminal of the sense voltage source 238 and a non-inverting input of the comparator 236. A negative terminal of the sense voltage source 238 is connected to ground 204. The sense voltage source 238 provides a voltage $V_{FLOOR}$.

The oscillator 240 has a ground input connected to ground 204 and provides a control signal at its output, also referred to herein as an oscillator control signal. Its output is connected to a control terminal (gate) of the converter switch 208, a control terminal (e.g., gate) of the charging switch 224, and an input of the inverter 242. The control signal has a frequency $F_{SW}$ and a duty cycle D, in which D can vary during operation of the boost converter 201. The control signal is used to control the converter switch 208 to open and close, to control the charging switch 224 to open and close, and to provide an input signal to the inverter 242. An output of the inverter 242 is connected to a control terminal (e.g., gate) of the discharging switch 226, in which a signal at the output of the inverter 242 controls the discharging switch 226 to open and close. A second terminal (source) of the converter switch 208 is connected to ground 204.

An output of the comparator 236 is connected to a rising edge input of the monostable multivibrator 244 (also called a monostable flip-flop). Accordingly, the monostable multivibrator 244 generates, at its respective output, a single output pulse of a specified duration when triggered by a rising edge of a signal received from the comparator 236. The output of the monostable multivibrator 244 is connected to a control terminal (e.g., gate) of the sense switch 218, in which the single output pulse controls the sense switch 218 to open and close. Together, the monostable multivibrator 244, the shunt resistor 216, the sense switch 218, and the hold capacitor 220 comprise a sampling circuit 247.

One cycle of the boost converter 201 corresponds to a time during which the converter switch 208 closes, then opens, then closes; or opens, then closes, then opens. This corresponds to the time taken by the converter switch 208 to open or close, then return to a starting state prior to the initial opening or closing. Accordingly, $F_{SW}$ (the frequency of the oscillator control signal) is also the switching frequency of the boost converter 201, and $1/F_{SW}$ is the period of one cycle of the boost converter 201. Further, the converter switch 208 is closed for a fraction D of each period of operation of the boost converter 201, in which D corresponds to the duty cycle of the oscillator control signal.

Responsive to the converter switch 208 being closed in a (first) energy storing phase, current flows through the converter switch 208 to ground 204. Also, in this first phase: the inductor 206 stores energy by generating a magnetic field; current in the inductor 206 increases; and there is a voltage across the inductor 206, in which the first terminal 205 of the inductor 206 is positive, and the second terminal 207 of the inductor 206 is negative. Responsive to the converter switch 208 being open in a (second) discharge phase, current flows through the converter diode 210 to the load capacitor 212 and the load 214. Also, in this second phase: the inductor 206 discharges its stored energy; current in the inductor 206 decreases; and there is a voltage across the inductor 206, in which the second terminal 207 of the inductor 206 is positive and the first terminal 205 of the inductor 206 is negative.

Change in current through the inductor 206 is related to voltage across the inductor 206 by the equation $V_L = L \times dI_L/dt$, where $V_L$ is the voltage across the inductor 206, L is the inductance of the inductor 206, $I_L$ is the current through the inductor 206, and t is time. As this equation demonstrates, the current $I_L$ through the inductor 206 is related to the time integral of the voltage $V_L$ across the inductor 206. Further, under steady state operation, the current through the inductor 206 returns to a same value after each cycle of the boost converter 201. Accordingly, during steady state operation of the boost converter 201, the time integral of the voltage, $V_L$, across the inductor 206 equals zero over one period of the boost converter 201.

The voltage sensor 222 outputs a voltage proportional to the voltage across the inductor 206. For example, in the energy storing phase, the voltage sensor 222 generates a positive voltage $V_{CHARGE}$, which equals the voltage across the inductor 206 while the converter switch 208 is closed, multiplied by a constant, k. Responsive to the converter switch 208 being open in the discharge phase, the inductor 206 discharges, and the voltage sensor 222 generates a negative voltage $V_{DISCHARGE}$. Because the voltage sensor 222 outputs a voltage proportional to the voltage across the inductor 206, $V_{DISCHARGE}$ equals the voltage across the inductor multiplied by the same constant, k. Accordingly, during steady state operation of the boost converter 201, the integral of $V_{CHARGE}$ from a time when the converter switch 208 closes to a next time when the converter switch 208 opens, plus the integral of $V_{DISCHARGE}$ from the time when the converter switch 208 opens to a time when the converter switch next closes, equals zero.

The oscillator control signal that causes the converter switch 208 to close in the energy storing phase also causes the charging switch 224 to close. In addition, the inverter 242 inverts the oscillator control signal, responsive to which the discharging switch 226 opens. Moreover, at the beginning of the energy storing phase, the sense capacitor 232 has the same voltage, $V_{FLOOR}$, as the positive terminal of the sense voltage source 238. When the converter switch 208 is closed, the charging transconductance amplifier 228 outputs a positive current responsive to the positive voltage output by the voltage sensor 222. This positive output current charges the sense capacitor 232 until the oscillator control signal controls the charging switch 224 to open.

The oscillator control signal that causes the converter switch 208 to open in the discharging phase also causes the charging switch 224 to open. In addition, the inverter 242 inverts the oscillator control signal, responsive to which the discharging switch 226 closes. When the converter switch 208 is open and the discharging switch 226 is closed, the discharging transconductance amplifier 230 outputs a negative current responsive to the negative voltage $V_{DISCHARGE}$ output by the voltage sensor 222. This negative output current discharges the sense capacitor 232 until the oscillator control signal controls the discharging switch 226 to open.

Voltage input to a transconductance amplifier is related to current output by the transconductance amplifier by the equation $\Delta I = g_m \times \Delta V$. While the charging switch 224 is closed and the discharging switch 226 is open, the charging transconductance amplifier 228 outputs a current $I_{CHARGE} = g_m \times V_{CHARGE}$ responsive to the voltage $V_{CHARGE}$ output by the voltage sensor 222. The current $I_{CHARGE}$ charges the sense capacitor 232 from $V_{FLOOR}$ to a peak voltage during the half-period of the oscillator control signal. As mentioned, the transconductance ($2 \times g_m$) of the discharging transconductance amplifier 230 is double the transconductance $g_m$ of the charging transconductance amplifier 228. Accordingly, while the charging switch 224 is open and the discharging switch 226 is closed, the discharging transconductance amplifier 230 outputs a current $I_{DISCHARGE} = 2 \times g_m \times V_{DISCHARGE}$ responsive to the voltage $V_{DISCHARGE}$ output by the voltage sensor 222.

If the transconductances of the charging transconductance amplifier 228 and the discharging transconductance amplifier 230 were both equal to $g_m$, the current output by the discharging transconductance amplifier 230 would finish discharging the voltage across the sense capacitor 232 to $V_{FLOOR}$ (from the peak voltage) at the same time that the discharging switch 226 opens. (This assumes that the duty cycle of the boost converter 201 does not change in the middle of a cycle of the boost converter 201. Also, note that in the boost converter 201 of FIG. 2A, the discharging switch 226 opens at the same time that the converter switch 208 closes. In the boost converter 249 of FIG. 2B, the discharging switch 226 opens at the same time that the converter switch 208 opens.) This means that it would take one full period of the boost converter 201 for the sense capacitor 232 to be charged to the peak voltage and fully discharged to $V_{FLOOR}$.

Because the transconductance of the discharging transconductance amplifier 230 equals $2 \times g_m$, the voltage across the sense capacitor 232 is discharged from the peak voltage to $V_{FLOOR}$ in half of a portion of a cycle of the boost converter 201 during which the sense capacitor 232 is discharged. Accordingly, the voltage across the sense capacitor 232 returns to $V_{FLOOR}$ at a time midway between the discharging switch 226 closing and the discharging switch 226 opening. This corresponds to the midpoint of the discharge phase of the boost converter 201, which is also the midpoint of the portion of a cycle of the boost converter 201 during which the converter switch 208 is open and current from the inductor 206 flows through the converter diode 210. As described with respect to FIGS. 3 and 5, this is the same time when the average value of the current through the inductor 206 $I_L$(average) equals the instantaneous value of the current through the inductor 206 $I_L$.

The average value of the current in the inductor 206 $I_L$(average) over a switching period of the boost converter 201 equals the instantaneous value of the current in the converter switch 208 in the middle of the conduction interval of the converter switch 208 (while the converter switch 208 is closed). The average value of the current in the inductor 206 $I_L$(average) over a switching period of the boost converter 201 also equals the instantaneous value of the current in the converter diode 210 in the middle of the conduction interval of the converter diode 210 (while the converter switch 208 is open). Consequently, sampling the instantaneous value of the current in the converter switch 208 or the converter diode 210 in the middle of their respective conduction intervals will yield the average value of the inductor 206 current $I_L$(average). Instantaneous values can be sampled approximately using, for example, a resistor-capacitor pair with a low RC time constant, such as the shunt resistor 216 and the hold capacitor 220 pair, as further described below. Other means of converting a current to a voltage, or of sampling a voltage, can also be used. Herein, "approximate" means within tolerances according to design parameters and process limitations.

Accordingly, the average value of the current through the inductor 206 $I_L$(average) equals the instantaneous value of the current through the inductor 206 $I_L$ at the halfway point between when the converter switch 208 opens and when the converter switch 208 next closes. The converter switch 208 is closed for a time $D/F_{SW}$ during each period of the boost converter 201, and open for a time $(1-D)/F_{SW}$ during each period of the boost converter 201. While the converter switch 208 is open, current flowing through the inductor 206 also flows through the converter diode 210, instead of through the converter switch 208. Measurement of average current through the inductor 206 $I_L$(average) while the converter switch 208 is open is illustrated in the first and second graphs 302 and 308, in FIG. 3. In the first graph 302, an average inductor current curve 306 intersects an inductor current curve 304 at, for example, times T3, T7, T11, T15, and T19. In the second graph 308, the average inductor current curve 306 intersects a converter diode current curve 310 at times T3, T7, T11, T15, and T19. In both the first and second graphs 302 and 308, the intersection point occurs halfway down a discharging leg of the respective current curve 304 or 310. Discharging leg refers to the portion of the respective current curve 304 or 310 during which the converter switch 208 is open and the inductor 206 is discharging. The average current measurement circuit 246 of the boost converter 201 of FIG. 2A is configured to capture $I_L$(average) while current flowing through the inductor 206 also flows through the converter diode 210.

Figure 2B:
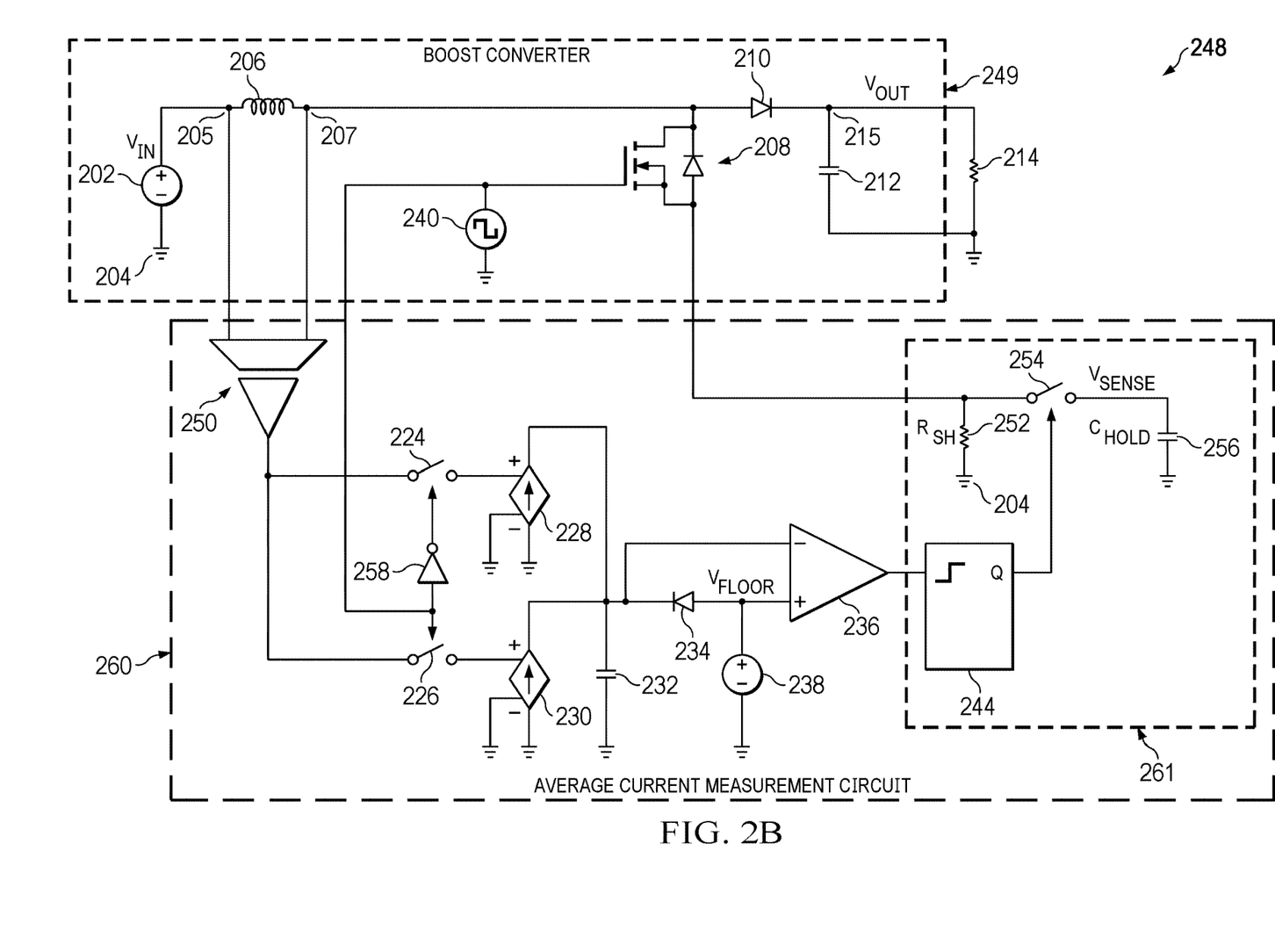
FIG. 2B shows a circuit diagram of an example system with an average current measurement circuit.

The average value of the current through the inductor 206 $I_L$(average) also equals the instantaneous value of the current through the inductor 206 $I_L$ at the halfway point between when the converter switch 208 closes and when the converter switch 208 next opens. At this time, current flowing through the inductor 206 also flows through the converter switch 208, and not through the converter diode 210. This is illustrated in the first and fifth graphs 302 and 402, in FIG. 4. In the first graph 302, an average inductor current curve 306 intersects an inductor current curve 304 at, for example, times T1, T5, T9, T13, and T17. In the fifth graph 402, the average inductor current curve 306 intersects a converter switch current curve 404 at times T1, T5, T9, T13, and T17. In both the first and fifth graphs 302 and 402, the intersection point occurs halfway up an energy-storing leg of the respective current curve 304 or 404. Energy-storing leg refers to the portion of the respective current curve 304 or 404 during which the converter switch 208 is closed and the inductor 206 is storing energy in a magnetic field. The average current measurement circuit 260 of the boost converter 249 of FIG. 2B is configured to capture $I_L$(average) while current flowing through the inductor 206 also flows through the converter switch 208.

When the voltage across the sense capacitor 232 equals $V_{FLOOR}$, the comparator 236 outputs a voltage corresponding to a logical one. When the voltage across the sense capacitor 232 does not equal $V_{FLOOR}$, the comparator 236 outputs a voltage corresponding to a logical zero. Accordingly, when $I_{DISCHARGE}$ causes the voltage across the sense capacitor 232 to equal $V_{FLOOR}$–the same time that the value of $I_L$(average) equals the instantaneous value of $I_L$–the signal output by the comparator 236 has a rising edge (from a logical zero voltage to a logical one voltage). This rising edge causes the monostable multivibrator 244 to generate a single output pulse so that the sense switch 218 closes for the duration of the pulse.

The resistance of the shunt resistor 216 $R_{SH}$ and the capacitance of the hold capacitor 220 $C_{HOLD}$ are selected so that the voltage across the hold capacitor 220 $V_{SENSE}$ is fully charged to a voltage across the shunt resistor 216 during the time when the sense switch 218 is closed. Because the sense switch 218 closes when the value of $I_L$(average) equals the instantaneous value of $I_L$, $V_{SENSE}$ charges to equal $I_L$(average)/$R_{SH}$ after the sense switch 218 closes. The hold capacitor 220 holds this voltage $I_L$(average)/$R_{SH}$ after the sense switch 218 opens in response to the end of the output pulse of the monostable vibrator 244. Accordingly, each time the monostable vibrator 244 generates an output pulse, the hold capacitor 220 is updated with a voltage that indicates the average current through the inductor 206 during a most recent cycle of the boost converter 201.

In some examples, an average current measurement circuit such as the average current measurement circuit 246 or the average current measurement circuit 260 (see FIG. 2B) can be used with a boost converter, buck converter, or buck-boost converter to determine $I_L$(average) while current is flowing through the converter's diode (such as converter diode 210) or switch (such as converter switch 208). In different types of converters, $I_L$(average) equals or can be used to determine different parameters of the converter that can be used to help regulate the converter. In a boost converter, $I_L$(average) equals the input current. In a buck converter, $I_L$(average) equals the output current. In a buck-boost converter, $I_L$(average) multiplied by the duty cycle of the converter provides information regarding both the input current and the output current of the converter. Accordingly, in some examples, an average current measurement circuit such as the average current measurement circuit 246 is connected to a buck converter or to a buck-boost converter to sample a current through a diode (rectifier) of the converter, so that the instantaneous value of the sampled current equals the value of an average current through an inductor of the converter.

FIG. 2B shows a circuit diagram of an example system 248 with an average current measurement circuit 260. As previously noted, similar components in similar configuration in different figures will be numbered the same. The system 248 includes a boost converter 249, an average current measurement circuit 260, and a load 214. The system 248 also includes an electrical ground 204. The boost converter 201 of FIG. 2A is configured to measure $I_L$(average) during a cycle of the boost converter 201 by measuring a voltage indicating current through the converter diode 210 at a time when the value of $I_L$(average) equals the instantaneous value of $I_L$. The boost converter 249 of FIG. 2B is configured to measure $I_L$(average) during a cycle of the boost converter 249 by measuring a voltage indicating current through the converter switch 208 at a time when the value of $I_L$(average) equals the instantaneous value of $I_L$.

The boost converter 249 includes a voltage source 202, an inductor 206, an n-channel enhancement mode metal-oxide-semiconductor field-effect transistor (NMOS FET) 208 (referred to herein as a converter switch 208), a converter diode 210, and a load capacitor 212. The voltage source 202, inductor 206, converter switch 208, converter diode 210, load capacitor 212, and load 214 of FIG. 2A respectively correspond to the voltage source 102, inductor 104, switch 106, diode 108, capacitor 110, and load 112 of FIG. 1A. The average current measurement circuit 260 includes a voltage sensor 250, charging and discharging switches 224 and 226, an inverter 258, charging and discharging transconductance amplifiers 228 and 230, a sense capacitor 232, a sense diode 234, a sense voltage source 238, a comparator 236 (in some examples, an error amplifier), a monostable multivibrator 244, a shunt resistor 252, a sense switch 254, and a hold capacitor 256. In some examples, the boost converter 249 and the average current measurement circuit 260 are included on a same piece of silicon (die). In another example, the boost converter 249 and the average current measurement circuit 246 are included on separate dies. In another example, the boost converter 249 is included on multiple dies, or elements thereof are not on the same die. In another example, the average current measurement circuit 246 is included on multiple dies, or elements thereof are not on the same die.

A first (positive) input of the voltage sensor 250 is connected to the second terminal 207 of the inductor 206, and a second (negative) input of the voltage sensor 250 is connected to the first terminal 205 of the inductor 206. (This is opposite to the polarity of connection of the voltage sensor 222 of FIG. 2A.) Accordingly, the voltage sensor 250 is connected to the inductor 206 so that while the converter switch 208 is closed so that the inductor 206 is storing energy, the voltage sensor 250 generates a negative (and, during steady state operation, approximately constant) voltage $V_{DISCHARGE}$; and while the converter switch 208 is open so that the inductor 206 discharges through the converter diode 210, the voltage sensor 250 generates a positive (and, during steady state operation, approximately constant) voltage $V_{CHARGE}$.

The source of the converter switch 208 is connected to a first terminal of the shunt resistor 252 with resistance $R_{SH}$, and to a first terminal of the sense switch 254. A second terminal of the sense switch 254 is connected to a first conductor of the hold capacitor 256 (e.g., via a first capacitor terminal) with capacitance $C_{HOLD}$. A second conductor of the hold capacitor 256 is connected (e.g., via a second capacitor terminal) to ground 204. The output of the oscillator 240 is connected to a control terminal (e.g., gate) of the converter switch 208, to a control terminal (e.g., gate) of the discharging switch 226, and to an input of the inverter 258. The output of the inverter 258 is connected to a control terminal (e.g., gate) of the charging switch 224. Also, the second conductor of the load capacitor 212 and the second terminal of the load 214 are connected to ground 204 (the load capacitor 212 connected via, for example, a second capacitor terminal). A voltage between the first conductor of the hold capacitor 256 and ground 204 is $V_{SENSE}$. Together, the monostable multivibrator 244, the shunt resistor 252, the sense switch 254, and the hold capacitor 256 comprise a sampling circuit 261.

While the converter switch 208 is open and current flows through the converter diode 210, the voltage sensor 250 generates the voltage $V_{CHARGE}$ and the oscillator 240 controls the charging switch 224 to close to conduct. (As described with respect to FIG. 2A, the charging switch 224 and the discharging switch 226 cannot both close to conduct at the same time.) The charging transconductance amplifier 228 uses the voltage $V_{CHARGE}$ to generate the current $I_{CHARGE}$, which charges the voltage across the sense capacitor 232 from $V_{FLOOR}$ to the peak voltage. While the converter switch 208 is closed and current flows through the switch 208, the voltage sensor 250 generates the voltage $V_{DISCHARGE}$ and the oscillator 240 controls the discharging switch 226 to close to conduct. The discharging transconductance amplifier 230 uses the voltage $V_{DISCHARGE}$ to generate the current $I_{DISCHARGE}$ to discharge the voltage across the sense capacitor 232.

As described above, because the transconductance of the discharging transconductance amplifier 230 equals 2×gm, discharging causes the voltage across the sense capacitor 232 to return to $V_{FLOOR}$ in half the time it would take if the transconductance of the discharging transconductance amplifier 230 equaled the transconductance of the charging transconductance amplifier 228. Accordingly, the voltage across the sense capacitor 232 is discharged to $V_{FLOOR}$ at the midpoint between the discharging switch 226 closing and the discharging switch 226 opening. This corresponds to the midpoint of the energy storing phase of the boost converter 201, which is also the midpoint of the portion of a cycle of the boost converter 201 during which the converter switch 208 is closed and current from the inductor 206 flows through the converter switch 208. As described with respect to FIGS. 4 and 5, this is the same time when the average value of the current through the inductor 206 $I_L$(average) equals the instantaneous value of the current through the inductor 206 $I_L$.

The voltage across the sense capacitor 232 equaling $V_{FLOOR}$ causes the comparator 236 to change state from outputting a logical zero voltage to outputting a logical one, which causes the monostable multivibrator 244 to output a pulse. The output pulse of the monostable multivibrator 244 causes the sense switch 254 to close to conduct, so that the hold capacitor 256 samples the voltage $I_L$(average)/$R_{SH}$ across the shunt resistor 252, and holds the sampled voltage after the output pulse of the monostable multivibrator 244 ends and the sense switch 254 opens.

The average current measurement circuit 246 of FIG. 2A and the average current measurement circuit 260 of FIG. 2B avoid some or all error due to process and temperature variations. The charging and discharging transconductance amplifiers 228 and 230 are designed to share similar design (and in some examples, can share some components) and can be designed to be located near each other on an integrated circuit (IC) or other circuit platform. This means that process variations that affect one of the charging and discharging transconductance amplifiers 228 and 230 will have proportional effects on the other of the charging and discharging transconductance amplifiers 228 and 230, so that the transconductance of the discharging transconductance amplifier 230 remains twice the transconductance of the charging transconductance amplifier 228. Temperature variations also cause proportional changes in the transconductances of the charging and discharging transconductance amplifiers 228 and 230. Accordingly, because the timing of the sense switch 254 control signal output by the monostable multivibrator 244 depends on the ratio between the transconductances of the charging and discharging transconductance amplifiers 228 and 230, the average current measurement circuits 246 and 260 avoid errors in measuring $I_L$(average) due to process and temperature variations. The average current measurement circuits 246 and 260 also function independently of variation in frequency $F_{SW}$ or duty cycle D of the control signal used to operate the converter switch 208, and independently of the inductance of the inductor 206. In some examples, an average current measurement circuit such as the average current measurement circuit 260 is connected to a buck converter or to a buck-boost converter to sample a current through a converter switch that controls a cycle of the converter, so that the instantaneous value of the sampled current equals the average value of the current through an inductor of the converter.

Figure 3:
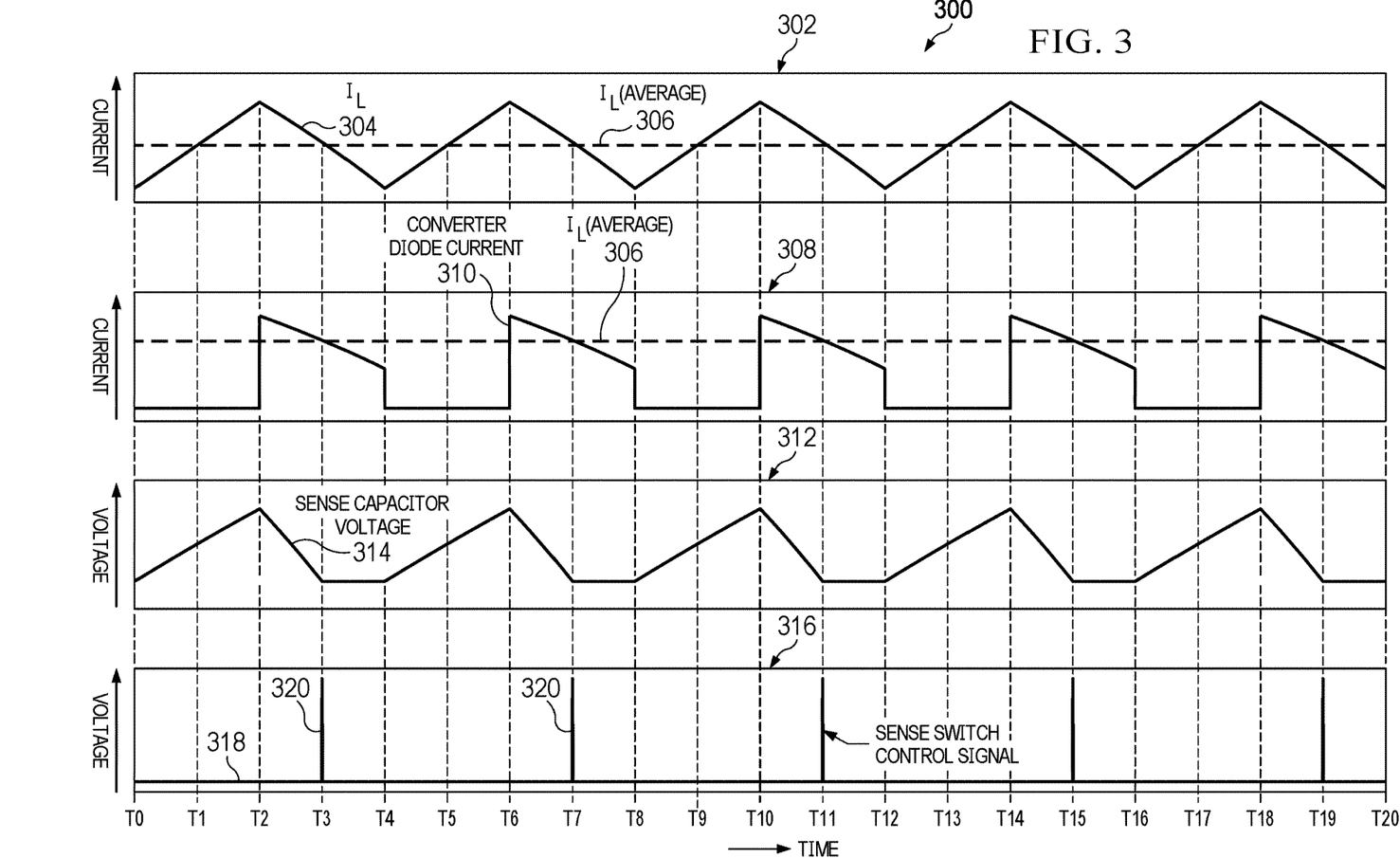
FIG. 3 shows a graph of voltage against time for example signals of the system of FIG. 2A.

FIG. 3 shows graphs 300 of current or voltage against time for example signals of the system 200 of FIG. 2A. The horizontal axis represents time. Signal waveforms in the graphs 300 correspond to steady state operation of the converter 201.

In a first graph 302, showing an inductor current curve 304 depicting $I_L$ over time and an average inductor current curve 306 describing $I_L$(average) over time, the vertical axis represents current. Time T0 to time T4 represents one cycle of the converter 201, in which the converter 201 is operated with a duty cycle D of 50%. From time T0 to time T2, the inductor 206 stores energy, so that $I_L$ increases from a relatively low current $I_L$(low) to a relatively high current $I_L$(high). In a converter operated in continuous conduction mode, as shown in the first graph 302, the relatively low current $I_L$(low) is a current with a value greater than zero. From time T2 to time T4, the inductor 206 discharges, so that $I_L$ decreases from the relatively high current $I_L$(high) to the relatively low current $I_L$(low). The average inductor current curve 306 intersects the inductor current curve 304 at two different sets of times, namely: times T1, T5, T9, T13, and T17, corresponding to midpoints of respective converter switch 208 conduction intervals; and times T3, T7, T11, T15, and T19, corresponding to midpoints of respective converter diode 210 conduction intervals. The curves in each of the graphs 300 repeat cyclically, so that the behaviors described from time T0 to time T4 repeat for times T4 to T8, T8 to T12, T12 to T16, and T16 to T20.

In a second graph 308, showing the average inductor current curve 306 and a converter diode current curve 310 describing the current through the converter diode 210 over time, the vertical axis represents current. From time T0 to time T2, the converter switch 208 is closed, shorting the second terminal 207 of the inductor 206 to ground 204 so that the value of the converter diode current 310 equals zero. From time T2 to time T4, the converter switch 208 is open, so that the current 304 through the inductor 206 passes through the converter diode 210, and, accordingly, is equal to the converter diode current 310. At times T3, T7, T11, T15, and T19, the value of $I_L$(average) equals the instantaneous value of the converter diode current 310.

In a third graph 312, showing a sense capacitor voltage curve 314 describing the voltage across the sense capacitor 232 over time, the vertical axis represents voltage. A cycle of the converter 201 from time T0 to time T4 is described as an example. From time T0 to time T2, the sense capacitor 232 is charged by the current generated by the charging transconductance amplifier 228, and the sense capacitor voltage 314 increases from $V_{FLOOR}$ to a peak voltage. From time T2 to time T3, the sense capacitor 232 is discharged by the current generated by the discharging transconductance amplifier 230. Accordingly, the sense capacitor voltage 314 discharges from the peak voltage to $V_{FLOOR}$ from time T2 to time T3, twice as quickly as it would if the discharging transconductance amplifier 230 had the same transconductance as the charging transconductance amplifier 228. As described above, if the transconductances were equal, the sense capacitor voltage 314 would reach $V_{FLOOR}$ at time T4 instead of time T3, in which time T3 is midway between times T2 and T4. From time T3 to time T4, the discharging transconductance amplifier 230 continues to discharge the sense capacitor 232, but the sense capacitor voltage 314 is prevented from falling below $V_{FLOOR}$ by the sense voltage supply 238.

In a fourth graph 316, showing a sense switch control signal curve 318 describing the voltage output by the monostable multivibrator 244 over time, the vertical axis represents voltage. Except at times T3, T7, T11, T15, and T19, the sense switch control signal voltage 318 equals zero. At time T3, for example, the sense capacitor voltage 314 reaching $V_{FLOOR}$ causes the output signal from the comparator 236 to have a rising edge. The rising edge triggers the monostable multivibrator 244 to output a pulse 320 that triggers the sense switch 218 to close and the hold capacitor 220 to capture a voltage indicating $I_L$(average).

Figure 4:
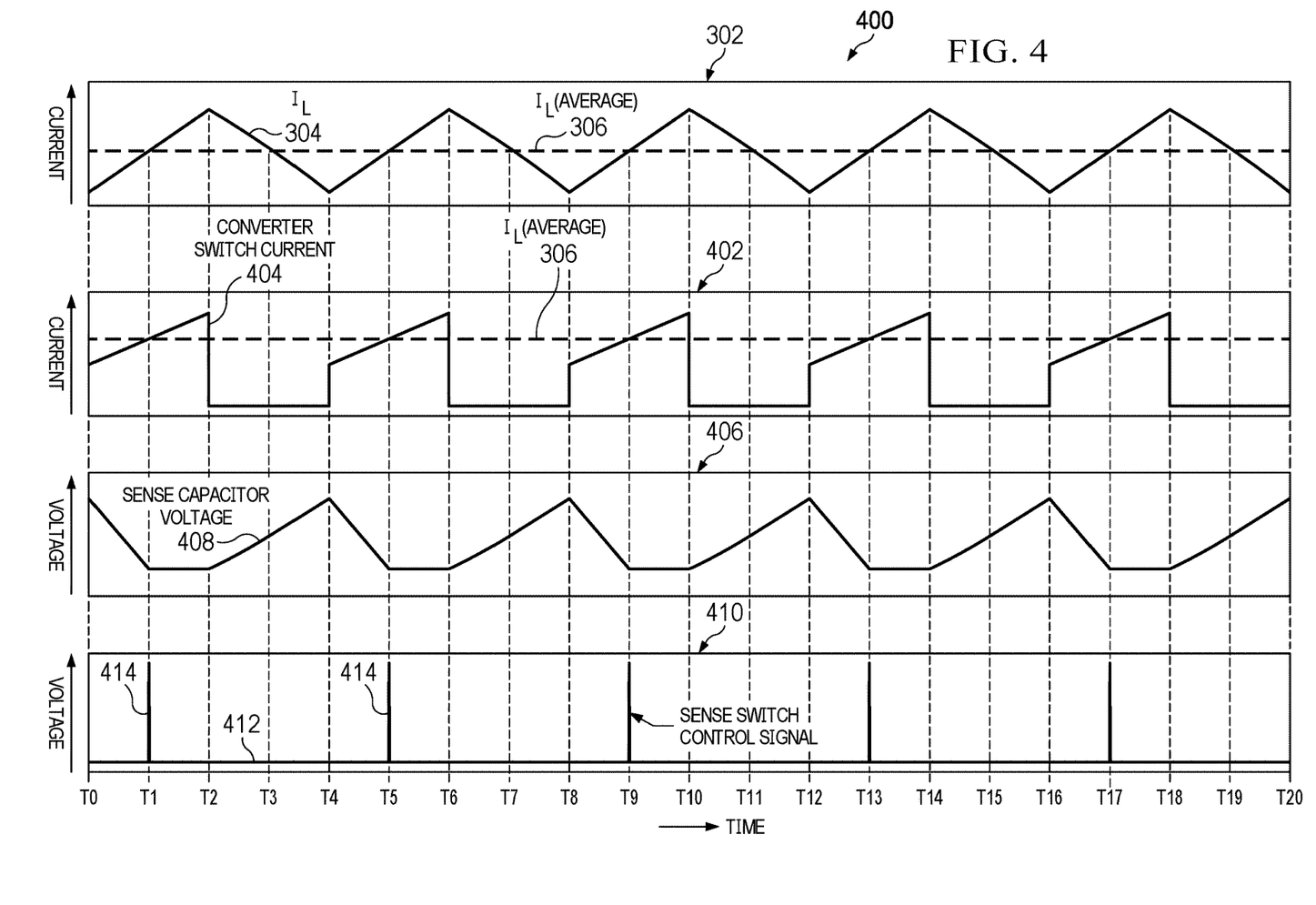
FIG. 4 shows a graph of voltage against time for example signals of the system of FIG. 2B.

FIG. 4 shows graphs 400 of current or voltage against time for example signals of the system 248 of FIG. 2B. The horizontal axis represents time. Signal waveforms in the graphs 400 correspond to steady state operation of the converter 249. The first graph 302, showing the inductor current curve 304 describing $I_L$ over time and the average inductor current curve 306 describing $I_L$(average) over time, is included for reference. The curves in each of the graphs 400 repeat cyclically, so that the behaviors described from time T0 to time T4 repeat for times T4 to T8, T8 to T12, T12 to T16, and T16 to T20.

In a fifth graph 402, showing the average inductor current curve 306 and a converter switch current curve 404 describing the current through the converter switch 208 over time, the vertical axis represents current. From time T0 to time T2, the converter switch 208 is closed, so that the current through the inductor 206 passes through the converter switch 208, and accordingly, is equal to the converter switch current 404. At time T1, the value of $I_L$(average) equals the instantaneous value of the converter switch current 404. From time T2 to time T4, the converter switch 208 is open, so that the value of the converter switch current 404 equals zero.

In a sixth graph 406, showing a sense capacitor voltage curve 408 describing the voltage across the sense capacitor 232 over time, the vertical axis represents voltage. From time T2 to time T4, the sense capacitor 232 is charged by the current generated by the charging transconductance amplifier 228, and the sense capacitor voltage 408 increases from $V_{FLOOR}$ to a peak voltage. From time T4 to time T5, the sense capacitor 232 is discharged by the current generated by the discharging transconductance amplifier 230. Accordingly, the sense capacitor voltage 408 discharges from the peak voltage to $V_{FLOOR}$ from time T4 to time T5, twice as quickly as it would if the discharging transconductance amplifier 230 had the same transconductance as the charging transconductance amplifier 228. As described above, if the transconductances were equal, the sense capacitor voltage 408 would reach $V_{FLOOR}$ at time T6 instead of time T5, in which time T5 is midway between times T4 and T6. From time T5 to time T6, the discharging transconductance amplifier 230 continues to discharge the sense capacitor 232, but the sense capacitor voltage 408 is prevented from falling below $V_{FLOOR}$ by the sense voltage supply 238.

In a seventh graph 410, showing a sense switch control signal curve 412 describing the voltage output by the monostable multivibrator 244 over time, the vertical axis represents voltage. Except at times T1, T5, T9, T13, and T17, the sense switch control signal curve 412 equals zero. At T5, for example, the sense capacitor voltage 408 reaching $V_{FLOOR}$ causes the output signal of the comparator 236 to have a rising edge. The rising edge triggers the monostable multivibrator 244 to output a pulse 414 that triggers the sense switch 254 to close and the hold capacitor 256 to capture a voltage indicating $I_L$(average).

Figure 5:
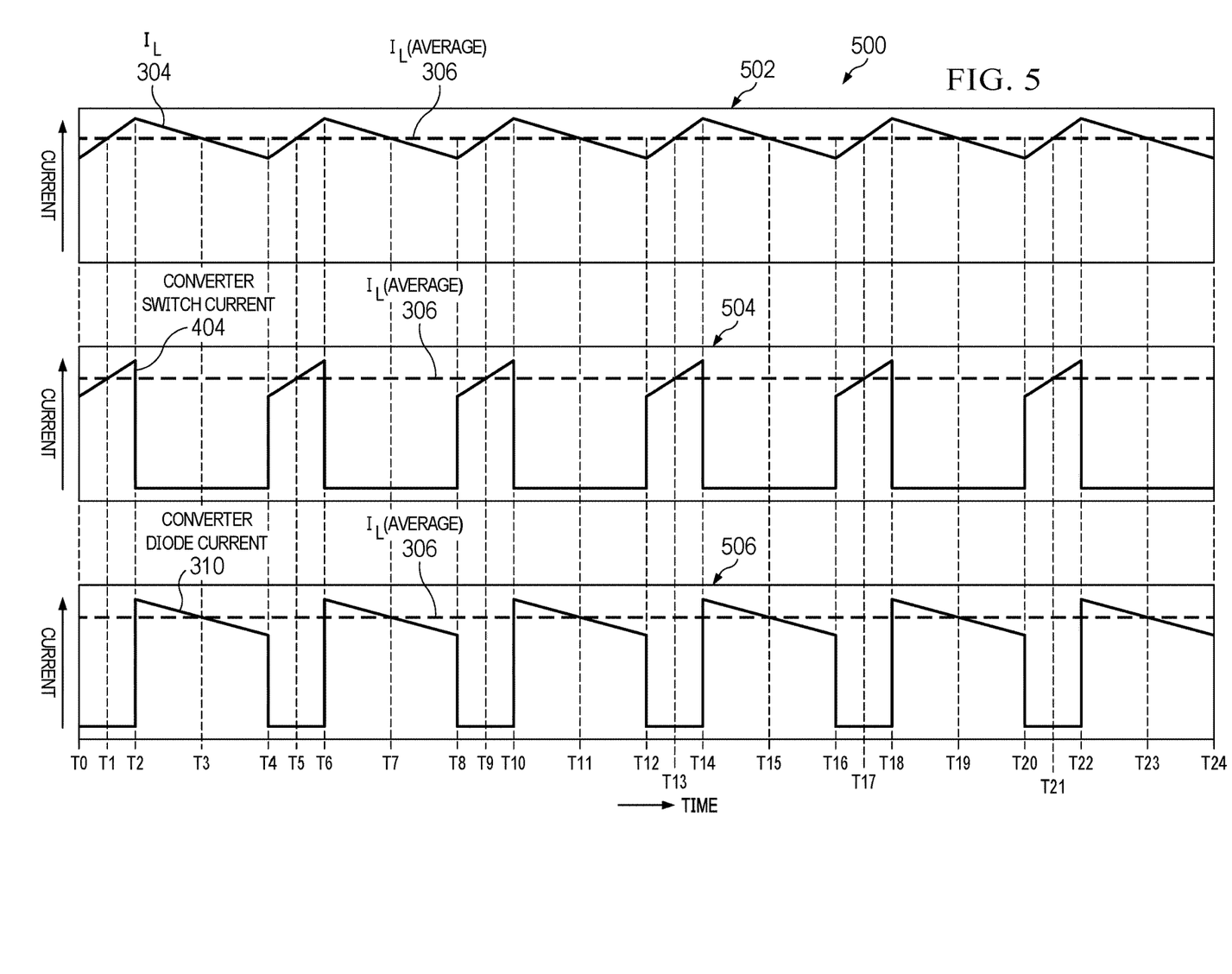
FIG. 5 shows graphs of current against time for example signals of either the system of FIG. 2A or the system of FIG. 2B.

FIG. 5 shows graphs 500 of current against time for example signals of either the system 200 of FIG. 2A or the system 248 of FIG. 2B. The horizontal axis represents time, and the vertical axis represents current. Signal waveforms in the graphs 500 correspond to steady state operation of either the boost converter 201 or the boost converter 249. The curves in each of the graphs 500 repeat cyclically, so that the behaviors described from time T0 to time T4 repeat for times T4 to T8, T8 to T12, T12 to T16, T16 to T20, and T20 to T24.

An eighth graph 502 shows the current $I_L$ through the inductor 206 while the boost converter 201 or 248 is operated with a duty cycle D other than 50%. A ninth graph 504 shows the current through the converter switch 208 while the boost converter 201 or 248 is operated with this duty cycle D. A tenth graph 506 shows the current through the converter diode 210 while the boost converter 201 or 249 is operated with this duty cycle D. Accordingly, the time from the converter switch 208 being closed T0 to the time when the converter switch 208 is next opened T2 is different from the time when the converter switch 208 is opened T2 to when the converter switch 208 is next closed T4. An average current measurement circuit 246 or 260 remains effective to measure $I_L$(average) regardless of variation in duty cycle because $I_L$(average) can be found at the midpoint of the conduction interval of the converter switch 208, a time during which the converter switch 208 is closed and current from the inductor 206 flows through the converter switch 208. Alternatively, the current sense circuit 246 or 260 samples $I_L$(average) at the midpoint of the conduction interval of the converter diode 210, a time during which the converter switch 208 is open and current from the inductor 206 flows through the converter diode 210. The 1:2 ratio of the transconductances of (respectively) the charging transconductance amplifier 228 and the discharging transconductance amplifier 230 enables these midpoints to be reliably determined, independently of process and temperature variation, as described above.

Figure 6:
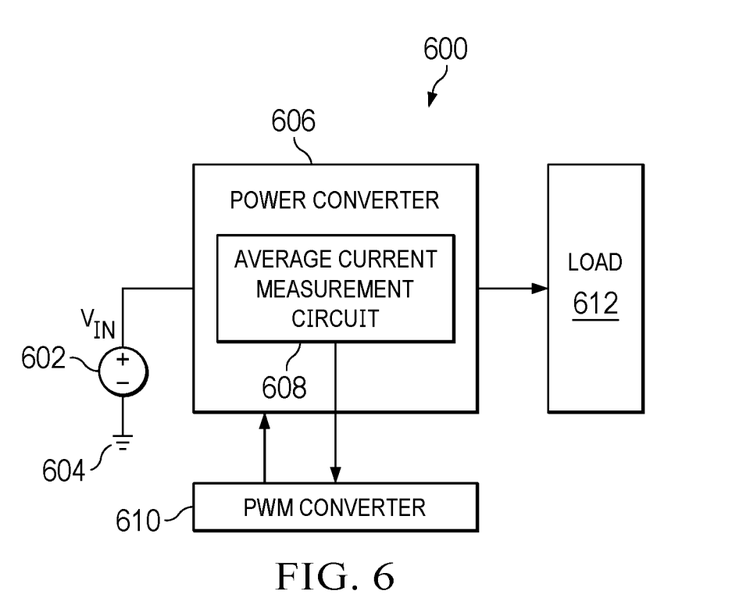
FIG. 6 shows a block diagram of an example power converter system.

FIG. 6 shows a block diagram of an example power converter system 600. The power converter system 600 includes a voltage source, a power converter 606 with an average current measurement circuit 608, a PWM converter 610, and a load 612. The voltage source 602 has a positive terminal and a negative terminal. The negative terminal of the voltage source 602 is connected to the ground 604. The positive terminal of the voltage source 602 is connected to the power converter 606. The power converter 606 can be, for example, a buck converter, a boost converter, or a buck-boost converter. The average current measurement circuit 608 can be configured to measure an average current through an inductor of the power converter 606 during a conduction interval of a rectifier diode of the power converter 606. Alternatively, the average current measurement circuit 608 can be configured to measure an average current through an inductor of the power converter 606 during a conduction interval of a control switch of the power converter 606. The pulse width modulation (PWM) controller 610 is connected to the power converter 606 to control the control switch of the power converter 606. The average current measurement circuit 608 is connected to the PWM controller 610 to provide feedback to facilitate control by the PWM controller 610 of the power converter 606. The power converter 606 is connected to power the load 612. In some examples, the power converter 606 (other than the inductor) is included in an IC. In some examples, the PWM controller 610 is also included in the IC. In some examples, one or more additional portions of the power converter system 600 are included in the IC.

Modifications are possible in the described embodiments, and other embodiments are possible, within the scope of the claims.

In some examples, a power converter including an average current measurement circuit, such as the average current measurement circuit 246 or the average current measurement circuit 260, is included in an IC.

In some examples, a MOSFET other than an enhancement mode MOSFET is used. In some examples, a p-channel MOSFET is used. In some examples, a type of transistor (or other switching element) is used other than as described herein or shown in the drawings. In some examples, one or more of the switches described herein can be implemented as pole switches.

In some examples the charging and discharging transconductance amplifiers 228 and 230 are configured to operate in respective linear response regions.

In some examples, the ratio of the transconductance of the charging transconductance amplifier 228 to the transconductance of the discharging transconductance amplifier 230 is other than 1:2. In some such examples, the transconductances of the charging and discharging transconductance amplifiers 228 and 230 are selected to measure an inductor current level other than an average inductor current.

In some examples, capacitive elements other than capacitors are used.

In some examples, resistive elements other than resistors are used.

In some examples, a circuit other than or including a resistor (or other resistive element) is used to convert a current through the converter diode or the converter switch to a voltage to generate a sensed voltage. In some examples, a voltage capture circuit other than or including a capacitor (or other capacitive element) is used to capture the sensed voltage.

In some examples, a pulse generator other than a monostable multivibrator is used.

In some examples, the voltage sensor 222 is a sense winding on the inductor 206.

In some examples, equalities of voltages, currents, and other values as expressed herein are approximate.

In some examples, a current transformer can be used instead of a shunt resistor to convert a current to a voltage.

In some examples alternative to FIG. 1A, the third input of the average current measurement circuit 103 is coupled so that it is included in a current path of the switch 106 while the switch 106 is closed. For example, the third input of the average current measurement circuit 103 can be coupled to the second terminal of the switch 106. In some examples alternative to FIG. 1A, the third input of the average current measurement circuit 103 is coupled to a different point in the system 100 (than shown in FIG. 1A) that is included in a current path of the diode 108 while the switch 106 is open.

In some examples alternative to FIG. 1B, the third input of the average current measurement circuit 119 is coupled to a different point in the system 116 (than shown in FIG. 1B) that is included in a current path of the of the switch 118 while the switch 118 is closed, or that is included in a current path of the diode 122 while the switch 118 is open.

In some examples alternative to FIG. 1C, the second input of the average current measurement circuit 129 is coupled to a different point in the system 124 (than shown in FIG. 1C) that is included in a current path of the switch 126 while the switch 126 is closed, or that is included in a current path of the diode 128 while the switch 126 is open.

Approximately is used herein to mean within design requirements and within fabrication tolerances. Contemporaneously is used herein to mean at approximately the same time.

What is claimed is:

1. A circuit comprising:
   a voltage sensor having an output;
   a first transconductance amplifier having an input and a respective output and having a first transconductance;
   a second transconductance amplifier having a respective input and a respective output and having a second transconductance;
   a first switch coupled between the output of the voltage sensor and the input of the first transconductance amplifier;
   a second switch coupled between the output of the voltage sensor and the input of the second transconductance amplifier;
   a capacitive element having a first terminal coupled to the outputs of the first and second transconductance amplifiers;
   a comparator having a respective input and a respective output, in which its input is coupled to the outputs of the first and second transconductance amplifiers and to the first terminal of the capacitive element; and
   a sampling circuit coupled to the output of the comparator.

2. The circuit of claim 1, wherein the second transconductance is twice the first transconductance.

3. The circuit of claim 1, wherein the comparator input is a first comparator input, further comprising:
   a voltage source coupled to a second input of the comparator; and
   a diode having an anode coupled to the second input of the comparator and having a cathode coupled to the first input of the comparator.

4. The circuit of claim 1, wherein the capacitive element is a first capacitive element, and wherein the sampling circuit includes:
   a pulse generator having a respective input coupled to the output of the comparator and having a respective output;
   a third switch having a control terminal coupled to the output of the pulse generator and having first and second terminals;
   a resistor coupled to the first terminal of the third switch; and
   a second capacitive element coupled to the second terminal of the third switch.

5. The circuit of claim 4, wherein the pulse generator includes a monostable multivibrator.

6. The circuit of claim 1, wherein the first switch is configured to close responsive to an oscillator signal for a converter switch, and the second switch is configured to close responsive to an inverse of the oscillator signal.

7. The circuit of claim 1, further comprising an inverter circuit having an oscillator input coupled to a control terminal of the first switch and having a respective output coupled to a control terminal of the second switch.

8. The circuit of claim 1, further including:
   first and second inductor coupling terminals adapted to be coupled to respective first and second terminals of an inductor; and
   a third switch having a first state and a second state, one of the first and second state corresponding to the third switch being closed, and the other of the first and second state corresponding to the third switch being open, the third switch coupled to the first inductor coupling terminal, the third switch configured to cause the inductor to store energy after the first switch closes and to cause the inductor to discharge after the third switch opens;

wherein the voltage sensor has a first input coupled to one of the first and second inductor coupling terminals, and a second input coupled to another of the first and second inductor coupling terminals;

wherein the first transconductance amplifier is configured to charge the capacitive element in response to the output of the voltage sensor and to the third switch having the first state; and wherein the second transconductance amplifier is configured to discharge the capacitive element in response to the output of the voltage sensor and to the third switch having the second state.

9. The circuit of claim 8,
wherein the capacitive element is configured not to discharge to less than a selected constant voltage; and
wherein the sampling circuit is configured to sample a current after the capacitive element is discharged to the selected constant voltage.

10. The circuit of claim 9, wherein a ratio between the first transconductance and the second transconductance is selected so that the capacitive element discharges to the selected constant voltage contemporaneously with an instantaneous value of a current through the inductor equaling an average value of the current through the inductor.

11. A system comprising:
first and second inductor coupling terminals adapted to be coupled to respective first and second terminals of an inductor;
a voltage sensor having a first input coupled to the one of the first and second inductor coupling terminals, a second input coupled to another of the first and second inductor coupling terminals, and an output;
a diode having an anode and a cathode;
a first switch having a terminal coupled to the first inductor coupling terminal and either the anode or the cathode;
a first transconductance amplifier having an input and a respective output and having a first transconductance;
a second transconductance amplifier having a respective input and a respective output and having a second transconductance;
a second switch coupled between the output of the voltage sensor and the input of the first transconductance amplifier;
a third switch coupled between the output of the voltage sensor and the input of the second transconductance amplifier;
a capacitive element having a first terminal coupled to the outputs of the first and second transconductance amplifiers;
a comparator having a respective input and a respective output, in which its input is coupled to the outputs of the first and second transconductance amplifiers and to the first terminal of the capacitive element;
a sampling circuit coupled to the output of the comparator and to a current path of at least one of the diode or the third switch; and
a load coupled to at least one of: the anode, the cathode, the first inductor coupling terminal, or the second inductor coupling terminal.

12. The system of claim 11, wherein the second transconductance is twice the first transconductance.

13. The system of claim 11, wherein the diode is a first diode and the comparator input is a first comparator input, the circuit further comprising:
a voltage source coupled to a second input of the comparator; and
a second diode having an anode coupled to the second input of the comparator and having a cathode coupled to the first input of the comparator.

14. The system of claim 11, wherein the capacitive element is a first capacitive element and wherein the sampling circuit includes:
a pulse generator having a respective input coupled to the output of the comparator and having a respective output;
a fourth switch having a control terminal coupled to the output of the pulse generator and having first and second terminals;
a resistor coupled to the first terminal of the fourth switch; and
a second capacitive element coupled to the second terminal of the fourth switch.

15. The system of claim 14, wherein the pulse generator includes a monostable multivibrator.

16. The system of claim 11, wherein the second switch is configured to close responsive to an oscillator signal for a converter switch, and the third switch is configured to close responsive to an inverse of the oscillator signal.

17. The system of claim 11, further comprising an inverter circuit having an oscillator input coupled to a control terminal of the second switch and having a respective output coupled to a control terminal of the third switch.

18. The system of claim 11,
wherein the first switch has a first state and a second state, one of the first and second state corresponding to the first switch being closed, and the other of the first and second state corresponding to the first switch being open, the first switch configured to cause the inductor to store energy after the first switch closes and to cause the inductor to discharge after the first switch opens;
wherein the first transconductance amplifier is configured to charge the capacitive element in response to the output of the voltage sensor and to the third switch having the first state; and
wherein the second transconductance amplifier is configured to discharge the capacitive element in response to the output of the voltage sensor and to the third switch having the second state.

19. The system of claim 18,
wherein the capacitive element is configured not to discharge to less than a selected constant voltage;
wherein the sampling circuit is configured to sample a current after the capacitive element is discharged to the selected constant voltage; and
wherein a ratio between the first transconductance and the second transconductance is selected so that the capacitive element discharges to the selected constant voltage contemporaneously with an instantaneous value of a current through the inductor equaling an average value of the current through the inductor.

20. A circuit comprising:
first and second inductor coupling terminals adapted to be coupled to respective first and second terminals of an inductor;
a voltage sensor having a first input coupled to the one of the first and second inductor coupling terminals, a second input coupled to another of the first and second inductor coupling terminals, and an output;
a diode having an anode and a cathode;
a first switch having a first state and a second state, one of the first and second state corresponding to the first switch being closed, and the other of the first and second state corresponding to the first switch being open, the first switch coupled to the first inductor coupling terminal and to either the anode or the cathode, the first switch configured to cause the inductor to store energy after the first switch closes and to cause the inductor to discharge after the first switch opens;
a capacitive element;
a first transconductance amplifier having a first transconductance and configured to charge the capacitive element in response to the output of the voltage sensor and to the first switch having the first state;
a second transconductance amplifier having a second transconductance different from the first transconductance, and configured to discharge the capacitive element in response to the output of the voltage sensor and to the first switch having the second state;
a current sensing circuit configured to convert to a voltage a current through the diode or a current through the first switch to generate a sensed voltage;
a voltage capture circuit configured to capture the sensed voltage; and
a second switch configured to close, in response to a voltage across the capacitive element, to couple the current sensing circuit to the voltage capture circuit.

21. The circuit of claim 20,
wherein the capacitive element is configured not to discharge to less than a selected constant voltage;
wherein the second switch is configured to close after the capacitive element is discharged to the selected constant voltage; and
wherein a ratio between the first transconductance and the second transconductance is selected so that the capacitive element discharges to the selected constant voltage contemporaneously with an instantaneous value of a current through the inductor equaling an average value of the current through the inductor.

* * * * *